United States Patent Office 3,642,825
Patented Feb. 15, 1972

3,642,825
HETEROCYCLIC ORGANIC ALUMINUM COMPOUNDS AND THEIR PREPARATION
Lawrence H. Shepherd, Jr., Baton Rouge, La., assignor to Ethyl Corporation, New York, N.Y.
No Drawing. Continuation-in-part of applications Ser. No. 821,954 and Ser. No. 822,046, both May 5, 1969. This application Dec. 31, 1969, Ser. No. 889,741
Int. Cl. C07f 5/06
U.S. Cl. 260—340.6                                     20 Claims

ABSTRACT OF THE DISCLOSURE

Heterocyclic organic aluminum compounds in which an aluminum atom and two adjacent oxygen atoms are part of a ring system are described. They are prepared by either or both of the following oxidation processes:

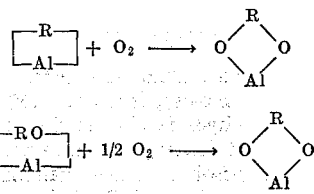

On hydrolysis, diols are liberated.

---

This application is a continuation-in-part of my prior copending applications Ser. No. 821,954 and Ser. No. 822,046, both filed May 5, 1969.

This invention relates to the heterocyclic organic aluminum compounds, their synthesis and their use in the synthesis of diols, especially diols having olefinic unsaturation in the molecule. More particularly, this invention relates to compounds in which an aluminum atom and two adjacent oxygen atoms are part of a ring system.

This invention provides an organic aluminum compound possessing a heterocyclic ring system in which the hetero atoms are two oxygen atoms and an aluminum atom, the oxygen atoms each being bonded directly to the aluminum atom. The organic aluminum compounds of this invention thus contain the grouping

where Al is two-thirds of a chemical equivalent of aluminum.

The aluminum compounds of this invention possess the moiety:

wherein R is a divalent cyclic or acylic hydrocarbon radical (i.e., a hydrocarbylene group) which may contain from 4 to about 40 or more carbon atoms and which is from 4 to about 7 carbon atoms in length, and Al is two-thirds of a chemical equivalent of aluminum. It will be seen that the ring system of the moiety involves a closed chain having from 7 to about 10 consecutively linked atoms.

There is a marked tendency for the heterocyclic aluminum compounds of this invention to form complexes with Lewis bases such as amines, ethers, thioethers, and the like. These complexes, especially when the Lewis base is a tertiary amine, a dialkyl ether, a cycloparaffinic monoether having the oxygen atom in a six-membered ring or a cycloparaffinic diether having the oxygen atoms in a five- or six-membered ring, constitute preferred embodiments of this invention.

To prepare the organic aluminum compounds of this invention an organoaluminum compound possessing a heterocyclic ring system in which the hetero atom is aluminum or in which the hetero atoms are an aluminum atom and an oxygen atom directly bonded thereto is subjected to controlled oxidation with a molecular oxygen-containing gas, e.g., air, oxygen, or air enriched with gaseous oxygen. Thus, use may be made of either or both of the following processes:

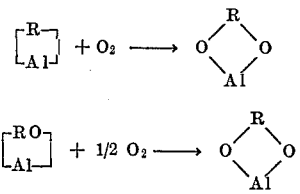

wherein R and Al have the meanings assigned to them hereinabove.

By way of example, oxidation (air, 0° C., one hour in 1,4-dioxane) of compounds of the general formula

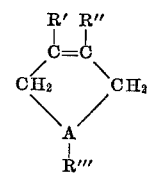

gives rise to the formation of compounds of the formula:

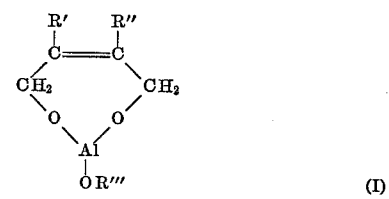

(I)

wherein R''' is a hydrocarbon group having up to about 18 carbon atoms (most preferably a lower alkyl group); R' is a hydrogen, alkyl or alkenyl group; and R'' is a hydrogen or alkyl group.

As another example, oxidation (air, 0° C., one hour, in 1,4-dioxane) of compounds of the general formula

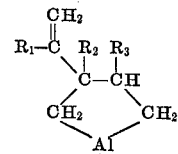

gives rise to the formation of compounds of the formula:

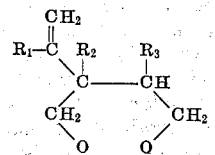

(II)

wherein R''' is a hydrocarbon group having up to about 18 carbon atoms (most preferably a lower alkyl group), and in the simplest cases, $R_1$ is hydrogen or an alkyl or alkenyl group, $R_2$ is hydrogen or an alkyl group, and $R_3$ is hydrogen or an alkyl, aryl or aralkyl group.

Similarly, controlled oxidation of a fused ring compound of the formula

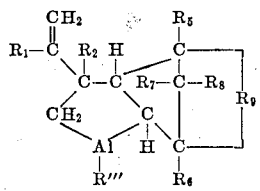

gives rise to the formation of compounds of the formula:

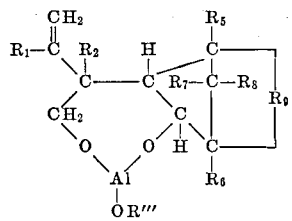
(III)

wherein, in the simplest situations, R''' is a hydrocarbon group having up to about 18 carbon atoms (most preferably lower alkyl group), $R_1$ is hydrogen or an alkyl or alkenyl group, $R_2$ is hydrogen or an alkyl group, each of $R_5$, $R_6$, $R_7$ and $R_8$ is, individually, hydrogen or an alkyl group and $R_9$ is a divalent hydrocarbon radical, normally from 1 to 3 carbon atoms in length and containing from 1 to about 10 carbon atoms.

In like manner, controlled oxidation of compounds of the formula

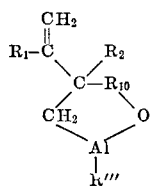

results in the production of compounds having the formula:

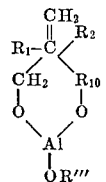
(IV)

wherein R''' is a hydrocarbon group having up to about 18 carbon atoms (most preferably a lower alkyl group), $R_1$ is hydrogen or an alkyl or alkenyl group, $R_2$ is hydrogen or an alkyl group, and $R_{10}$ is a divalent hydrocarbon radical, normally from 2 to 5 carbon atoms in length and containing from 2 to about 16 carbon atoms.

Accordingly, this invention provides organic aluminum compounds having such heterocyclic ring systems as an alumina-2,7,-dioxacyclohept-4-ene moiety, an alumina-2,7-dioxacycloheptane moiety having a vinylic substituent in the 4 position, an alumina-2,8-dioxacyclooctane moiety having a vinylic substituent in the 4 position, an alumina-2,9-dioxacyclononane moiety having a vinylic substituent in the 4 position, an alumina-2,10-dioxacyclodecane moiety having a vinylic substituent in the 4 position, an alumina-2,9-dioxacyclonon-4-ene moiety having a vinylic substituent in the 7 position, and the like.

Hydrolysis of compounds of Formulas I, II, III, and IV above (e.g., using water or moist air at 0–25° C., preferably followed by treatment with dilute aqueous mineral acid) results in the formation and liberation of diols having the corresponding skeletal configuration. Many such diols have novel structures and interesting properties.

In passing it should be mentioned that for all practical purposes the identity of R'' in the above depicted compounds (see Formulas I through IV) is of but academic interest inasmuch as the heterocyclic ring system is by far the most novel and useful segment of the over-all molecule. Since it is convenient to utilize diisobutylaluminum hydride in the synthesis of the cyclic organoaluminum reactants, R will frequently be isobutyl.

To still further appreciate the practice and advantages of this invention reference should be had to the following illustrative examples.

EXAMPLE I

A solution of 1-isobutylaluminacyclopent-3-ene in 1,4-dioxane is prepared by heating 274 mmoles of butadiene, 36 mmoles of aluminum metal, 1.23 moles of 1,4-dioxane and 31 mmoles of diisobutylaluminum hydride for six hours at 150 C. While holding the temperature of the solution between 0 and 25° C. dry air is bubbled therethrough over a period of two hours. The alumina-2,7-dioaxacylohept-4-ene moiety so produced is hydrolyzed with water followed by dilute hydrochloric acid at 25° C. whereby 2-butene-1,4-diol $$(HOCH_2CH=CHCH_2OH)$$

is produced.

EXAMPLE II

By heating activated aluminum metal (367 mmoles), diethyl ether (1.23 moles), isoprene (150 mmoles) and diisobutylaluminum hydride (24 mmoles) at 145–155° C. for three hours and filtering off unreacted aluminum, a clear solution of 1-isobutyl-3-methylaluminacyclopent-3-ene in diethyl ether is obtained. Oxidation of the 3-methylaluminacyclopent-3-ene moiety using the conditions referred to in Example I results in the formation of the 4-methyl - 1 - alumina - 2,7 - dioxacyclohept-4-ene moiety. On hydrolysis using water followed by HCl (aq.) 2-methyl-2-butene-1,4-diol is formed.

Repetition of the procedure of Example II whereby in successive runs the 3-methylaluminacyclopent-3-ene is formed in 1.23 moles of tetrahydropyran, 1.23 moles of N-methyl pyrrolidine, and 1.23 moles of 1,4-dioxane in lieu of the diethyl ether gives similar results.

EXAMPLE III

Powdered aluminum metal (365 mmoles), 2-ethyl butadiene (150 mmoles), and diisobutylaluminum hydride (30 mmoles) are reacted in 1,4-dioxane (1.23 moles) at 145–150° C. for two hours. A portion of the resulting liquid reaction product is treated with dry air as in Example I and this results in the formation of the 4-ethyl-1-alumina-2,7-dioxacyclohept-4-ene moiety. On hydrolysis with water followed by dilute hydrochloric acid at 25° C. 2-ethyl-2-butene-1,4-diol is liberated.

EXAMPLE IV

The procedure of Example III is repeated except that 150 mmoles of 2,3-dimethyl butadiene-1,3 is substituted for the 2-ethyl butadiene. On oxidation the 4,5-dimethyl-1-alumina-2,7-dioxacyclohept-4-ene moiety is formed. The hydrolysis product resulting therefrom is 2,3-dimethyl-2-butene-1,4-diol.

EXAMPLE V

The procedure of Example III is repeated with the exception that 150 mmoles of myrcene is used in lieu of 2-ethyl butadiene. Oxidation of the resultant 3-(4-methyl-3-pentenyl)aluminacyclopent-3-ene moiety gives the 4-(4-methyl-3-pentenyl) - 1 - alumina - 2,7 - dioxacyclohept-4-ene moiety which on hydrolysis yields 2-(4-methyl-3-pentenyl)-2-butene-1,4-diol.

EXAMPLE VI

A product containing the 3-isopropenylaluminacyclopentane moiety and the 3-vinyl-3-methylaluminacyclopentane moiety with the former predominating is prepared by charging an autoclave with activated aluminum powder (370 mmoles), 1,4-dioxane (1.23 moles), isoprene (150 mmoles), and diisobutylaluminum hydride (25 mmoles), pressurizing the system with ethylene and effecting reaction at 800 p.s.i. ethylene pressure for two hours at 150° C. On oxidizing the product with dry air as in Example I, there is formed a mixture of the 4-isopropenyl-1-alumina-2,7-dioxacycloheptane moiety and the 4-vinyl-4-methyl-1-alumina - 2,7 - dioxacycloheptane moiety with the former predominating. Hydrolysis of the mixture results in the liberation of 2-isopropenyl-butane-1,4-diol and a smaller quantity of 2-vinyl-2-methylbutane-1,4-diol.

EXAMPLE VII

The procedure of Example VI is repeated with the exception that the isoprene is replaced by butadiene. The oxidation product is the 4-vinyl-1-alumina-2,7-dioxacycloheptane moiety and this yields 2-vinylbutane-1,4-diol on hydrolysis.

EXAMPLE VIII

Substitution of 2-ethyl butadiene for the isoprene in the procedure of Example VI results for the most part in the formation of the 3-(1-ethylvinyl)aluminacyclopentane moiety which on oxidation gives the 4-(1-ethylvinyl)-1-alumina-2,7-dioxacycloheptane moiety which in turn gives on hydrolysis 2-(1-ethylvinyl)-butane-1,4-diol.

EXAMPLE IX

By repeating the procedure of Example VI using 2,3-dimethyl butadiene-1,3 in lieu of the isoprene the product prior to oxidation contains the 3-isopropenyl-3-methylaluminacyclopentane moiety. On oxidation this moiety is converted to the 4-isopropenyl-4-methyl-1-alumina-2,7-dioxacycloheptane moiety which on hydrolysis yields 2-isopropenyl-2-methylbutane-1,4-diol.

EXAMPLE X

Application of the oxidation and hydrolysis procedures of Example I to a product containing the 5-vinyl-3-aluminatricyclo[5.2.1.0$^{2,6}$]decane moiety

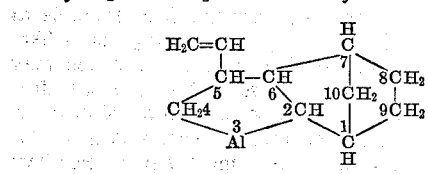

(produced by reacting the aluminacyclopent-3-ene moiety with bicyclo[2.2.1]hept-2-ene) results in the formation on oxidation of the 7-vinyl-4-alumina-3,5-dioxatricyclo[7.2.1.0$^{2,8}$]dodecane moiety:

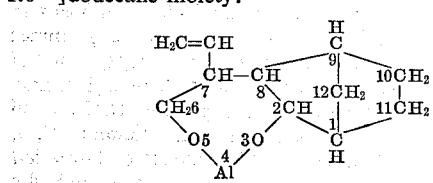

(It will be seen that the alumina-2,7-dioxacycloheptane moiety has a ring system fused thereon). On hydrolysis 3-(1-vinyl-2-hydroxyethyl)bicyclo[2.2.1]heptan-2-ol is recovered.

EXAMPLE XI

To 43 mmoles of 1-isobutyl-3-methylaluminacyclopent-3-ene contained in 30 milliliters of 1,4-dioxane is slowly added 6 milliliters (78 mmoles) of epichlorohydrin. On completion of the exothermic reaction the resultant reaction product is treated with dry air via the procedure of Example I. The resultant product, which contains the 4-isopropenyl - 6 - chloromethyl - 1 - alumina - 2,7 - dioxacycloheptane moiety with a smaller quantity of the 4-vinyl-4-methyl - 6 - chloromethyl - 1 - alumina - 2,7 - dioxacycloheptane moiety, is subjected to hydrolysis with water at 25° C. A mixture of 2-isopropenyl-4-chloromethylbutane-1,4-diol and 2-vinyl-2-methyl - 4 - chloromethylbutane-1,4-diol is produced, the former being in greater quantity.

EXAMPLE XII

Substitution of ethylene oxide for the epichlorohydrin in the procedure of Example XI results on oxidation in a product containing the 4-isopropenyl-1-alumina-2,7-dioxacycloheptane moiety and a smaller quantity of the 4-vinyl-4-methyl-1-alumina - 2,7-dioxacycloheptane moiety. On hydrolysis with water at 0–10° C., 2-isopropenylbutane-1,4-diol and a smaller quantity of 2-vinyl-2-methylbutane-1,4-diol are produced.

EXAMPLE XIII

Bis-(chloromethyl)oxetane (26.5 mmoles) is reacted with a dioxane solution of 1-isobutyl-3-methylaluminacyclopent-3-ene (21 mmoles) for three hours at 150° C. Treatment of the resultant product with dry air via the procedure of Example I yields a product composed predominately of the 4-isopropenyl-6,6-bis-chloromethyl-1-alumina-2,8-dioxacyclooctane moiety with a lesser quantity of the 4-vinyl-4-methyl-6,6-bis-chloromethyl-1-alumina-2,8-dioxacyclooctane moiety. On hydrolysis with water at 0–10° C., a mixture of 2-isopropenyl-4,4-bis-chloromethylpentane-1,5-diol along with a lesser quantity of 2-vinyl-2-methyl-4,4-bis-chloromethylpentane-1,5-diol is produced.

EXAMPLE XIV

A dioxane solution of 1-isobutyl-3-methylaluminacyclopent-3-ene is reacted with excess 2-methyl tetrahydrofuran for four hours at 150° C. After treatment of the reaction product with dry air via the procedure of Example I the system contains the following heterocyclic moieties: 4-isopropenyl-8-methyl-1-alumina - 2,9-dioxacyclononane; 4-vinyl-4,8-dimethyl - 1 - alumina-2,9-dioxacyclononane; and 4 - isopropenyl-5-methyl-1-alumina-2,9 - dioxacyclononane. The diols liberated on hydrolysis with water at 0–10° C. are 2-isopropenyl-6-methylhexane-1,6-diol; 2-vinyl-2,6-dimethylhexane-1,6-diol; and 2-isopropenyl-3-methylhexane-1,6-diol, respectively.

EXAMPLE XV

The oxidation and hydrolysis steps of Example XIV are applied to the product obtained by reacting activated aluminum powder, isoprene, and diisobutylaluminum hydride with an excess of 2-methyl tetrahydrofuran for four hours at 150° C. The same heterocyclic aluminum compounds and olefinic diols are produced.

EXAMPLE XVI

When 0.5 mole of activated aluminum powder, 0.93 mole of tetrahydrofuran, 0.20 mole of isoprene, and 56 mmoles of diisobutylaluminum hydride were reacted at 145–155° C. for 1.25 hours, a gelatinous reaction mixture was obtained. Addition of 75 milliliters (0.91 mole) of tetrahydrofuran resulted in a homogeneous solution from which the unreacted aluminum powder was removed by filtration. A portion of this reaction solution was oxidized with dry air at 0–10° C. for one hour. The resultant product, which contained the 4-isopropenyl-1-alumina-2,9-dioxacyclononane moiety, along with a lesser quantity of the 4-vinyl-4-methyl-1-alumina-2,9-dioxacyclononane moiety, was then hydrolyzed with dilute aqueous sodium hydroxide solution at 25° C. Distillation of the oxidized organic fraction gave 1.20 grams of a fraction boiling at approximately 84° C. at 0.2 mm. Hg. Analyses (v. pc., NMR and IR) indicated that this fraction was composed of 2-isopropenylhexane-1,6-diol (major component) and 2-vinyl-2-methylhexane-1,6-diol (minor component).

EXAMPLE XVII

An autoclave is charged with aluminum powder (435 mmoles), isoprene (150 mmoles), sodium aluminum tetraethyl (12 mmoles), and 1,4-dioxane (100 milliliters). The system is heated at 150° C. for three hours under 1000 p.s.i. hydrogen pressure. On oxidation and hydrolysis per the procedure of Example I, the final product is 2-methyl-2-butene-1,4-diol.

EXAMPLE XVIII

Myrcene (150 mmoles), sodium aluminum tetraethyl (18 mmoles), and aluminum powder (10 grams) are added to 100 milliliters of tetrahydrofuran and heated at 150° C. under 1000 p.s.i. hydrogen for three hours. The reaction product is dissolved in diethyl ether and treated with dry air for one hour at 0–25° C. Thereafter the product is hydrolyzed by treatment with water followed by HCl (aq.) at 0–25° C. The principal diol product is 2-[1-(4-methyl - 3 - pentenyl)vinyl]-hexane-1,6-diol and this results from the hydrolysis of the 4-[1-(4-methyl-3-pentenyl)vinyl]-1-alumina-2,9-dioxacyclononane moiety.

EXAMPLE XIX

A system composed of 500 mmoles of isoprene, 15 grams of activated aluminum powder, 1.03 moles of tetrahydropyran, and 85 mmoles of diisobutylaluminum hydride is heated in a closed reaction vessel for one hour at 150° C. and then for two hours at 185° C. After cooling to room temperature, the reaction product is treated with dry air for two hours at 0–20° C. and then hydrolyzed at 0–5° C. using dilute hydrochloric acid. The diols so obtained are 2-isopropenylheptane-1,7-diol (major product) and 2-vinyl-2-methylheptane-1,7-diol (minor product) which result from the hydrolysis of the 4-isopropenyl-1-alumina-2,10-dioxacyclodecane and 4-vinyl-4-methyl - 1 - alumina - 2,10 - dioxacyclodecane, moieties, respectively.

EXAMPLE XX 1-isobutyl-3-methylaluminacyclopent - 3 - ene dioxanate (33 mmoles) is heated at 150° C. for 1.5 hours with 15 milliliters of 2,5-dihydrofuran in 40 milliliters of 1,4-dioxane. Oxidation of the product via the procedure of Example I gives a product containing, as the major heterocyclic moiety, 7-isopropenyl - 1 - alumina-2,9-dioxacyclonon-4-ene and as the minor heterocyclic moiety, 7-vinyl-7-methyl-1-alumina-2,9-dioxacyclonon-4-ene. On hydrolysis, these moieties give, respectively, 5-isopropenyl-2-hexene-1,6-diol and 5-vinyl-5-methyl-2-hexene-1,6-diol.

It can be seen from the above examples that the present invention may be successfully applied to a wide variety of suitable reactants which in turn may be produced by various processes. For example, this invention may be applied to nonionic organoaluminum compounds possessing an aluminacycloalkene moiety which may be produced as described in detail in copending application Ser. No. 771,651, filed Oct. 29, 1968, all disclosure of which is incorporated herein. Alternatively, these nonionic organoaluminum compounds may be prepared as described in detail in copending application Ser. No. 822,046, filed May 5, 1969, all disclosure of which is incorporated herein. Similarly, the oxidation process of this invention may be applied to organoaluminum compounds possessing a vinylic aluminacycloalkane moiety whose production is described in detail in copending application Ser. No. 821,954, filed May 5, 1969, all disclosure of which is incorporated herein. Furthermore, reactants for use in the oxidation process of this invention may be prepared by the procedures described in copending applications Ser. No. 748,613, filed July 30, 1968; Ser. No. 822,045, filed May 5, 1969; Ser. No. 875,554, filed Nov. 10, 1969; and Ser. No. 889,740, filed Dec. 31, 1969, all disclosures of which are incorporated herein.

Accordingly, in the last analysis, this invention makes possible the synthesis of a wide variety of olefinically unsaturated diols from an acyclic diene, notably butadiene or butadiene substituted on either or both of its internal carbon atoms.

Still further illustrations of the materials provided by this invention are set forth in the ensuing tabulation.

TABLE.—ILLUSTRATIVE PRODUCTS OF THIS INVENTION

| Olefinically unsaturated alumina dioxacyclic hydrocarbon moiety produced by oxidation | Olefinically unsaturated diol produced by hydrolysis |
|---|---|
| 4,5-diethyl-1-alumina-2,7- dioxacyclohept-4-ene. | 2,3-diethyl-2-butene-1,4-diol. |
| 4-phenyl-1-alumina-2,7-dioxacyclohept-4-ene. | 2-phenyl-2-butene-1,4-diol. |
| 2-phenethyl-1-alumina-2,7-dioxacyclohept-4-ene. | 2-phenyethyl-2-butene-1,4-diol. |
| 4-vinyl-5-methyl-1-alumina-2,7-dioxacycloheptane. | 2-vinyl-3-methylbutane-1,4-diol. |
| 4-isopropenyl-5-phenyl-1-alumina-2,7-dioxacycloheptane. | 2-isopropenyl-3-phenylbutane-1,4-diol. |
| 4-vinyl-5,5-dimethyl-1-alumina-2,7-dioxacycloheptane. | 2-vinyl-3,3-dimethylbutane-1,4-diol. |
| 4-vinyl-6-ethyl-1-alumina-2,7-dioxacycloheptane. | 2-vinyl-4-ethylbutane-1,4-diol. |
| 4-vinyl-1-alumina-2,8-dioxacyclooctane. | 2-vinylpentane-1,5-diol. |
| 4-vinyl-6-ethyl-1-alumina-2,9-dioxacyclononane. | 2-vinyl-4-ethylhexane-1,6-diol. |
| 4-vinyl-7,7-dimethyl-1-alumina-2,10-dioxacyclodecane. | 2-vinyl-5,5-dimethylheptane-1,7-diol. |
| 7-vinyl-1-alumina-2,9-dioxacyclonon-4-ene. | 5-vinyl-2-hexene-1,6-diol. |
| 7-(1-ethylvinyl)-1-alumina-2,9- dioxacyclonon-4-ene. | 5-(1-ethylvinyl)-2-hexene-1,6-diol. |
| 7-isopropenyl-7-methyl-1-alumina-2,9-dioxacyclonon-4-ene. | 5-isopropenyl-5-methyl-2-hexene-1,6-diol. |
| 7-isopropenyl-9,12,12-trimethyl-4-alumina-3,5-dioxatricyclo-[7.2.1.0²·⁸]dodecane. | 3-(1-isopropenyl-2-hydroxyethyl)-4,7,7-trimethylbicylco [2.2.1]-heptan-2-ol. |
| 7-(1-ethylvinyl)-10-vinyl-4-alumina-3,5-dioxatricyclo[7.2.1.0²·⁸]-dodecane. | 3-[1-(1-ethylvinyl)-2-hydroxyethyl]-5-vinylbicyclo[2.2.1]-heptan-2-ol. |
| 6-[1-(4-methylpent-3-enyl)-vinyl]-3-alumina-2,4-dioxatricyclo-[5.3.0.0⁸·¹⁰]decane. | 3-[(1-hydroxymethyl-2-methylene-6 methyl)hept-5-enyl]bicyclo-[2.1.0]pentan-2-ol. |

In preparing the heterocyclic organic aluminum compounds of this invention the cyclic organoaluminum reactant is subjected to controlled oxidation by molecular oxygen—i.e., the cyclic organoaluminum reactant is treated with a gas-containing molecular oxygen (air, oxygen, air enriched with oxygen, a mixture of rare gas and oxygen, etc.). This oxidation is preferably effected in the liquid phase and from the standpoint of simplicity, the use of air is generally advantageous. Inasmuch as the reactant is an organoaluminum compound the liquid phase will of course be anhydrous and it is desirable to insure that the molecular oxygen-containing gas is likewise essentially anhydrous. The oxidation reaction may be effected in any suitable inert solvent, such as a hydrocarbon medium (e.g., paraffinic or aromatic hydrocarbon solvents such as hexane, heptane, octane, decane, cyclohexane, benzene, toluene, xylene, and the like). For best results, the oxidation is effected in the presence of a suitable amount of a Lewis base—e.g., at least 1–2 moles of Lewis base per mole of cyclic organoaluminum reactant being treated with a molecular oxygen-containing gas. Suitable Lewis bases for this purpose include amines and ethers and preferred Lewis bases include tertiary amines (e.g., trimethyl amine, dimethylethyl amine, triethyl amine, tributyl amine, triphenyl amine, tribenzyl amine, benzyldimethyl amine, N-methyl morpholine, N,N-diethyl aniline, N,N,N',N'-tetramethyl methylene diamine, N,N, N',N'-tetramethyl ethylene diamine, pyridine, N-methyl pyrrolidine, triethylene diamine, quinuclidine, and the like); dialkyl ethers (e.g., dimethyl ether, diethyl ether, diisopropyl ether, methylisoamyl ether, dibutyl ether, dihexyl ether and the like); cycloparaffinic monoethers having a six-membered ring (e.g., tetrahydropyran—pentamethylene oxide—and ring alkylated derivatives thereof); and cycloparaffinic diethers having a five- or six-membered ring (e.g., 1,4-dioxane, 1,3-dioxolane, 2-methyl-2-ethyl-1,3-dioxolane; and the like); and other similar substances.

Ordinarily the controlled oxidation is performed at a low or moderate temperature so as to minimize side reactions. Generally speaking, the temperature of the system will be maintained within the range of from about −20 to about 100° C., temperatures within the range of from about 0 to about 35° C. being preferred. Contact times ranging from less than an hour up to several hours or more will generally be found sufficient. The optimum conditions for use in effecting the oxidation step will of course vary to some extent depending on such factors as the identity of the cyclic organoaluminum reactant, the nature of the solvent used, the concentration of oxygen contained in the oxidizing gas feed stream, and the like, and can readily be ascertained by conducting a few pilot experiments.

To prepare the diols having olefinic unsaturation in the molecule, recourse is had to hydrolyzing an organic aluminum compound possessing a heterocyclic ring system in which the hetero atoms are two oxygen atoms and an aluminum atom, the oxygen atoms each being bonded directly to the aluminum atom, and in which there is olefinic unsaturation in the hydrocarbon portion of the ring system. This hydrolysis is normally performed at or below room temperature although temperatures in the range of —10 to about 50° C. are usually satisfactory. In effecting this hydrolysis, use may be made of water, moist air, aqueous mineral acids or bases such as hydrochloric acid, sulfuric acid aqueous sodium hydroxide solution or the like. It may be helpful to perform a few pilot experiments in order to ascertain the optimum hydrolysis conditions for any given set of circumstances. The product is readily recovered from the hydrolysis system by means of conventional techniques such as distillation (especially at reduced pressure), solvent extraction, chromatographic adsorption, or the like.

The heterocyclic organic aluminum compounds of this invention are of particular value as chemical intermediates in the preparation of olefinically unsaturated diols. They have other uses, however. For example, the heterocyclic organic aluminum compounds of this invention may be used as reagents to deactivate aluminum alkyls, as antiwear and anticorrosion additives for lubricating oils and greases, and as combustion modifiers for solid propellent fuel compositions.

Uses for the diols produced on hydrolysis include their use as monomers in the preparation of condensation polymers such as polyesters and polyurethanes which in turn may be used in the manufacture of films, fabrics, textiles, coatings, plasticizers, caulking compounds, adhesives, drying oils, and the like. The presence of the unsaturation in these diols is advantageous as it affords sites for cross-linking to occur—e.g., by addition polymerization, vulcanization, oxidation, or the like. The diols may also be used as perfumes, especially in the manufacture of household detergents, toilet bars and the like. In addition, the diols are flammable and thus may be used as sources of heat, light, carbon dioxide and water.

I claim:

1. An organic aluminum compound possessing a heterocyclic ring system in which the hetero atoms are two oxygen atoms and an aluminum atom, the oxygen atoms each being bonded directly to the aluminum atom, said compound being selected from the group consisting of I 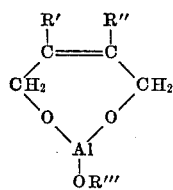

wherein $R'''$ is a hydrocarbon group having up to about 18 carbon atoms, $R'$ is a hydrogen, alkyl, or alkenyl group, and $R''$ is a hydrogen or alkyl group;

II. 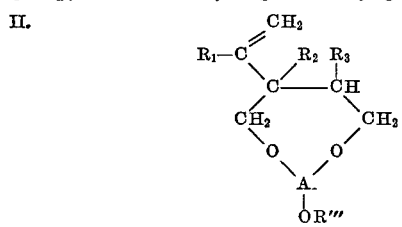

wherein $R'''$ is a hydrocarbon group having up to about 18 carbon atoms, $R_1$ is hydrogen or an alkyl or alkenyl group, $R_2$ is hydrogen or an alkyl group, and $R_3$ is hydrogen or an alkyl, aryl or aralkyl group;

III. 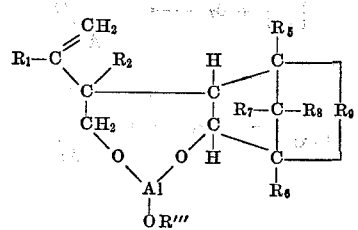

wherein $R'''$ is a hydrocarbon group having up to about 18 carbon atoms, $R_1$ is hydrogen or an alkyl or alkenyl group, $R_2$ is hydrogen or an alkyl group, each of $R_5$, $R_6$, $R_7$ and $R_8$ is, individually, hydrogen or an alkyl group, and $R_9$ is a divalent hydrocarbon radical from 1 to 3 carbon atoms in length and containing from 1 to about 10 carbon atoms; and IV. 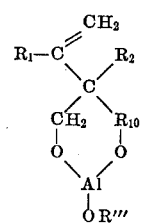

wherein $R'''$ is a hydrocarbon group having up to about 18 carbon atoms, $R_1$ is hydrogen or an alkyl or alkenyl group, $R_2$ is hydrogen or an alkyl group, and $R_{10}$ is a divalent hydrocarbon radical from 2 to 5 carbon atoms in length and containing from 2 to about 16 carbon atoms.

2. A compound according to claim 1 wherein $R'''$ is a lower alkyl group.

3. A compound according to claim 1 complexed with a Lewis base and wherein $R'''$ is a lower alkyl group.

4. An organic aluminum compound characterized in that it contains the moiety:

wherein R is a hydrocarbylene group containing from 4 to about 40 carbon atoms and which is from 4 to about 7 carbon atoms in length, and Al is two-thirds of a chemical equivalent of aluminum; the third valence bond of the aluminum being satisfied by an oxyhydrocarbon group of the formula:

—OR''' wherein $R'''$ is a hydrocarbon group having up to about 18 carbon atoms.

5. A compound according to claim 4 wherein $R'''$ is a lower alkyl group.

6. A compound according to claim 4 complexed with a Lewis base.

7. The process of preparing an organic aluminum compound possessing a heterocyclic ring system in which the hetero atoms are two oxygen atoms and an aluminum atom, the oxygen atoms each being bonded directly to the aluminum atom, which comprises subjecting an organoaluminum compound possessing a heterocyclic ring system in which the hetero atom is aluminum or in which the hetero atoms are an aluminum atom and an oxygen atom directly bonded thereto to controlled oxidation with a molecular oxygen-containing gas, said process being in accordance with either or both of the following equations:

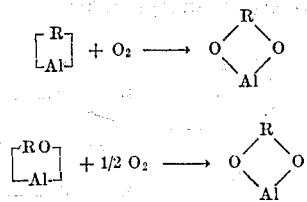

wherein R is a hydrocarbylene group containing from 4 to about 40 carbon atoms and which is from 4 to about 7 carbon atoms in length, and Al is two-thirds of a chemical equivalent of aluminum; the third valence bond of the aluminum initially being bonded to a hydrocarbon group having up to about 18 carbon atoms and in the final product by an oxyhydrocarbon group having up to about 18 carbon atoms.

8. The process of claim 7 wherein said hydrocarbon group and said oxyhydrocarbon group are, respectively, a lower alkyl group and a lower alkoxy group.

9. The process of claim 7 performed in the presence of a Lewis base using air as the oxidizing agent and wherein said hydrocarbon group and said oxyhydrocarbon group are, respectively, a lower alkyl group and a lower alkoxy group.

10. A compound according to claim 1 wherein said ring system is an alumina - 2,7 - dioxacyclohept - 4 - ene moiety.

11. A compound according to claim 1 wherein said ring system is an alumina-2,7-dioxacycloheptane moiety having a vinylic substituent in the 4 position.

12. A compound according to claim 1 wherein said ring system is an alumina-2,8-dioxacyclooctane moiety having a vinylic substituent in the 4 position.

13. A compound according to claim 1 wherein said ring system is an alumina-2,9-dioxacyclononane moiety having a vinylic substituent in the 4 position.

14. A compound according to claim 1 wherein said ring system is an alumina-2,10-dioxacyclodecane moiety having a vinylic substituent in the 4 position.

15. A compound according to claim 1 wherein said ring system is an alumina - 2,9 - dioxacyclonon - 4 - ene moiety having a vinylic substituent in the 7 position.

16. A compound according to claim 1 complexed with a Lewis base.

17. A compound according to claim 1 complexed with a tertiary amine, a dialkyl ether, a cycloparaffinic monoether having the oxygen atom in a six-membered ring or a cycloparaffinic diether having the oxygen atoms in a five- or six-membered ring.

18. A compound according to claim 1 complexed with 1,4-dioxane.

19. The process of preparing an organic aluminum compound possessing a heterocyclic ring system in which the hetero atoms are two oxygen atoms and an aluminum atom, the oxygen atoms each being bonded directly to the aluminum atom, which comprises subjecting an organoaluminum compound possessing a heterocyclic ring system in which the hetero atom is aluminum or in which the hetero atoms are an aluminum atom and an oxygen atom directly bonded thereto to controlled oxidation with a molecular oxygen-containing gas.

20. The process of claim 7 performed in the presence of a Lewis base and using air as the oxidizing agent.

References Cited
UNITED STATES PATENTS

| | | | |
|---|---|---|---|
| 3,035,077 | 5/1962 | Johnson | 260—448 AD |
| 3,354,192 | 11/1967 | Frank et al. | 260—448 AD |

FOREIGN PATENTS

| | | | |
|---|---|---|---|
| 874,164 | 8/1961 | Great Britain | 260—448 AD |

JAMES E. POER, Primary Examiner

H. M. S. SNEED, Assistant Examiner

U.S. Cl. X.R.

260—340.9, 448 AD, 635

PO-1050
(5/69)

UNITED STATES PATENT OFFICE
CERTIFICATE OF CORRECTION

Patent No. 3,642,825      Dated February 15, 1972

Inventor(s) Lawrence H. Shepherd, Jr.

It is certified that error appears in the above-identified patent and that said Letters Patent are hereby corrected as shown below:

Column 1, lines 20, 21, 25, and 26 read "Al", should read -- al --; line 47 reads "-O-Al-O-", should read -- -O-al-O- --; lines 49, 56, and 61 read "Al", should read -- al --. Column 2, lines 15, 18, 19, and 20 read "Al", should read -- al --; line 30 (in the formula) reads "A", should read -- Al --. Column 3, line 45, the formula is incorrect and should read --

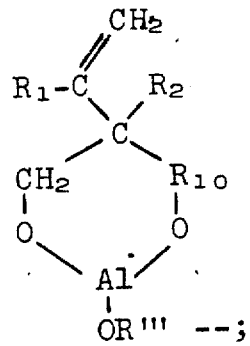

--;

line 75 reads " R" ", should read -- R''' --. Column 4, line 1 reads "dioaxacyclohept-4-ene", should read -- dioxacyclohept-4-ene --. Column 5, line 44 (in the formula) reads "Al", should read -- al --; line 57 (in the formula) reads "Al", should read -- al --. Column 6, line 65 reads "(v. pc.,", should read -- (vpc,. --. Column 7, line 31 reads -- 2,10-dioxacyclodecane moieties,", should read -- 2,10-dioxacyclodecane moieties, --. Column 9, line 73 (in the formula) reads "A", should read -- Al --. Column 10, line 50 (in the formula) reads "Al", should read -- al --; line 54 reads "Al is", should read -- al is --. Column 11, lines 6 and 7 (in the formula) reads "Al", should read -- al --; lines 11 and 12 (in the formula) reads "Al", should read -- al --; line 17 reads "Al is", should read -- al is --. Column 12, line 16, Patent Claim 19 was rewritten during prosecution as Patent Claim 7.

Signed and sealed this 15th day of August 1972.

(SEAL)
Attest:

EDWARD M. FLETCHER, JR.
Attesting officer

ROBERT GOTTSCHALK
Commissioner of Pate